(12) United States Patent
Dreher

(10) Patent No.: US 10,340,755 B1
(45) Date of Patent: Jul. 2, 2019

(54) ENERGY HARVESTING AND CONVERTING BEAM PUMPING UNIT

(71) Applicant: George R Dreher, Midland, TX (US)

(72) Inventor: George R Dreher, Midland, TX (US)

(*) Notice: Subject to any disclaimer, the term of this patent is extended or adjusted under 35 U.S.C. 154(b) by 0 days.

(21) Appl. No.: 15/810,083

(22) Filed: Nov. 12, 2017

Related U.S. Application Data

(60) Provisional application No. 62/535,945, filed on Jul. 23, 2017, provisional application No. 62/535,846, filed on Jul. 22, 2017, provisional application No. 62/426,337, filed on Nov. 25, 2016, provisional application No. 62/421,410, filed on Nov. 14, 2016.

(51) Int. Cl.

| | |
|---|---|
| *H01K 1/22* | (2006.01) |
| *F01B 9/02* | (2006.01) |
| *E21B 43/12* | (2006.01) |
| *E21B 47/00* | (2012.01) |
| *F16H 21/18* | (2006.01) |
| *H02K 3/46* | (2006.01) |
| *F16H 29/02* | (2006.01) |
| *H02K 1/18* | (2006.01) |
| *H01F 27/28* | (2006.01) |
| *H02K 1/22* | (2006.01) |

(52) U.S. Cl.
CPC ............... *H02K 1/223* (2013.01); *F01B 9/02* (2013.01); *F16H 21/18* (2013.01); *F16H 29/02* (2013.01); *H01F 27/28* (2013.01); *H02K 1/185* (2013.01); *H02K 3/46* (2013.01); *E21B 43/127* (2013.01); *E21B 47/0008* (2013.01)

(58) Field of Classification Search
CPC .......... H02K 1/223; H02K 1/185; H02K 3/46; H01F 27/28; F16H 29/02; F16H 21/18; F01B 9/02
See application file for complete search history.

(56) References Cited

U.S. PATENT DOCUMENTS

| | | | | |
|---|---|---|---|---|
| 5,409,356 | A * | 4/1995 | Massie | F04B 47/022 417/416 |
| 6,325,142 | B1 * | 12/2001 | Bosley | E21B 47/0008 166/53 |
| 7,168,924 | B2 * | 1/2007 | Beck | E21B 43/126 417/1 |

(Continued)

*Primary Examiner* — Michael C Zarroli

(57) ABSTRACT

A walking beam pumping unit onboard above surface energy harvester and converter invention that can supplement electric power to actuate a reciprocating walking beam pumping unit's prime mover, auxiliary devices, and control devices. In one embodiment, the walking beam pumping unit kinetic energy can assist gravity actuated linear and circular generators attached on the reciprocating walking beam, crank arms, pitman arms, head, and articulated reciprocating counterweight. The electro mechanical devices can switch between generating and motoring and send electric current to a capacitor for distribution. In another embodiment, the walking beam pumping unit kinetic energy can assist a mechanically actuated reciprocating piston linear generator attached to the reciprocating walking beam and foundation. In another embodiment, a circular generator device is attached to the crank arms. Used to supply supplemental power for the lifting and lowering of loads with a reciprocating walking beam pumping unit and auxiliary devices.

21 Claims, 15 Drawing Sheets

(56) References Cited

U.S. PATENT DOCUMENTS

| | | | | |
|---|---|---|---|---|
| 7,321,211 | B2* | 1/2008 | Peterson | F04B 17/03 166/104 |
| 9,353,617 | B2* | 5/2016 | Peterson | F04B 47/022 |
| 9,431,928 | B2* | 8/2016 | Dudley | H01L 41/125 |
| 9,771,786 | B2* | 9/2017 | Raglin | E21B 43/38 |
| 10,094,212 | B2* | 10/2018 | Shanks | E21B 47/12 |
| 10,107,282 | B1* | 10/2018 | Dreher | F04B 47/145 |
| 2005/0230974 | A1* | 10/2005 | Masters | H02K 7/1892 290/1 R |
| 2007/0075545 | A1* | 4/2007 | Wilson, Sr. | F03G 7/10 290/1 R |
| 2009/0179431 | A1* | 7/2009 | Wilson, Sr. | H02K 7/1815 290/1 R |
| 2011/0080130 | A1* | 4/2011 | Venkataraman | H02P 6/182 318/474 |
| 2012/0228875 | A1* | 9/2012 | Hardin, Jr. | E21B 41/0085 290/52 |
| 2012/0228882 | A1* | 9/2012 | Dirksen | E21B 41/0085 290/1 R |
| 2013/0192682 | A1* | 8/2013 | Freese | F16L 55/00 137/13 |
| 2014/0239745 | A1* | 8/2014 | Nair | H01L 41/125 310/20 |
| 2016/0204719 | A1* | 7/2016 | Lesanko | F03G 7/08 318/759 |
| 2017/0292353 | A1* | 10/2017 | Liu | E21B 43/127 |

\* cited by examiner

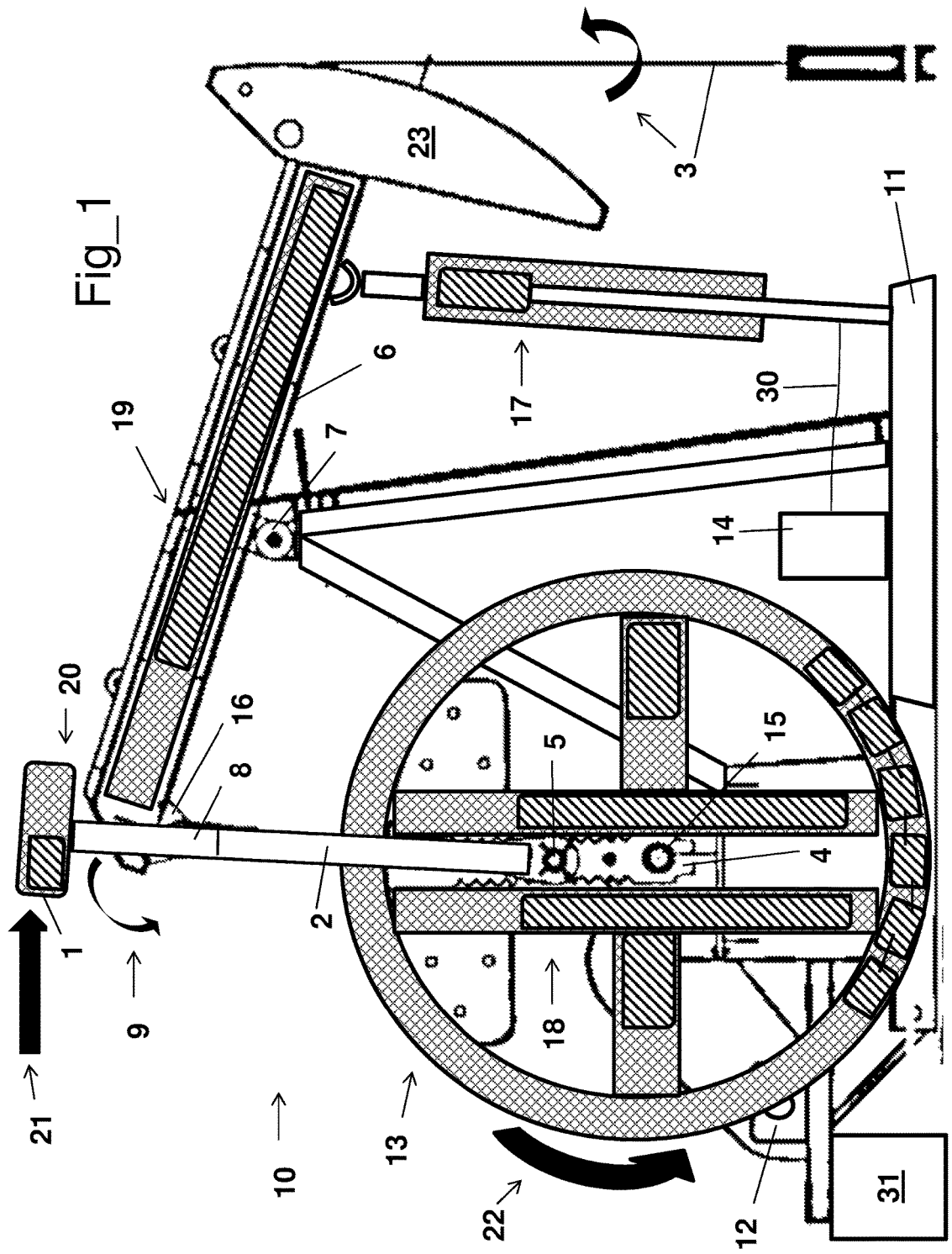

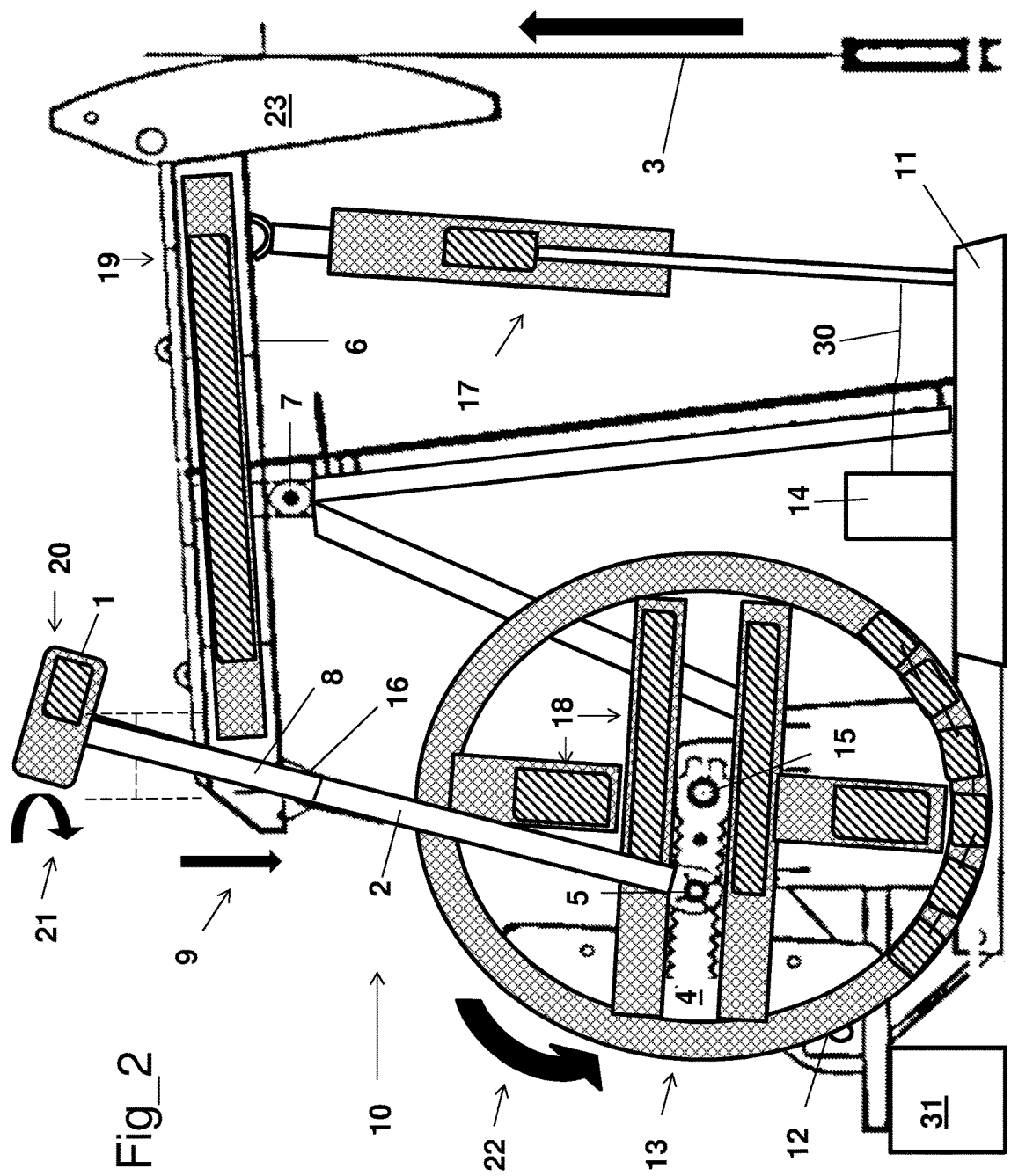
Fig_2

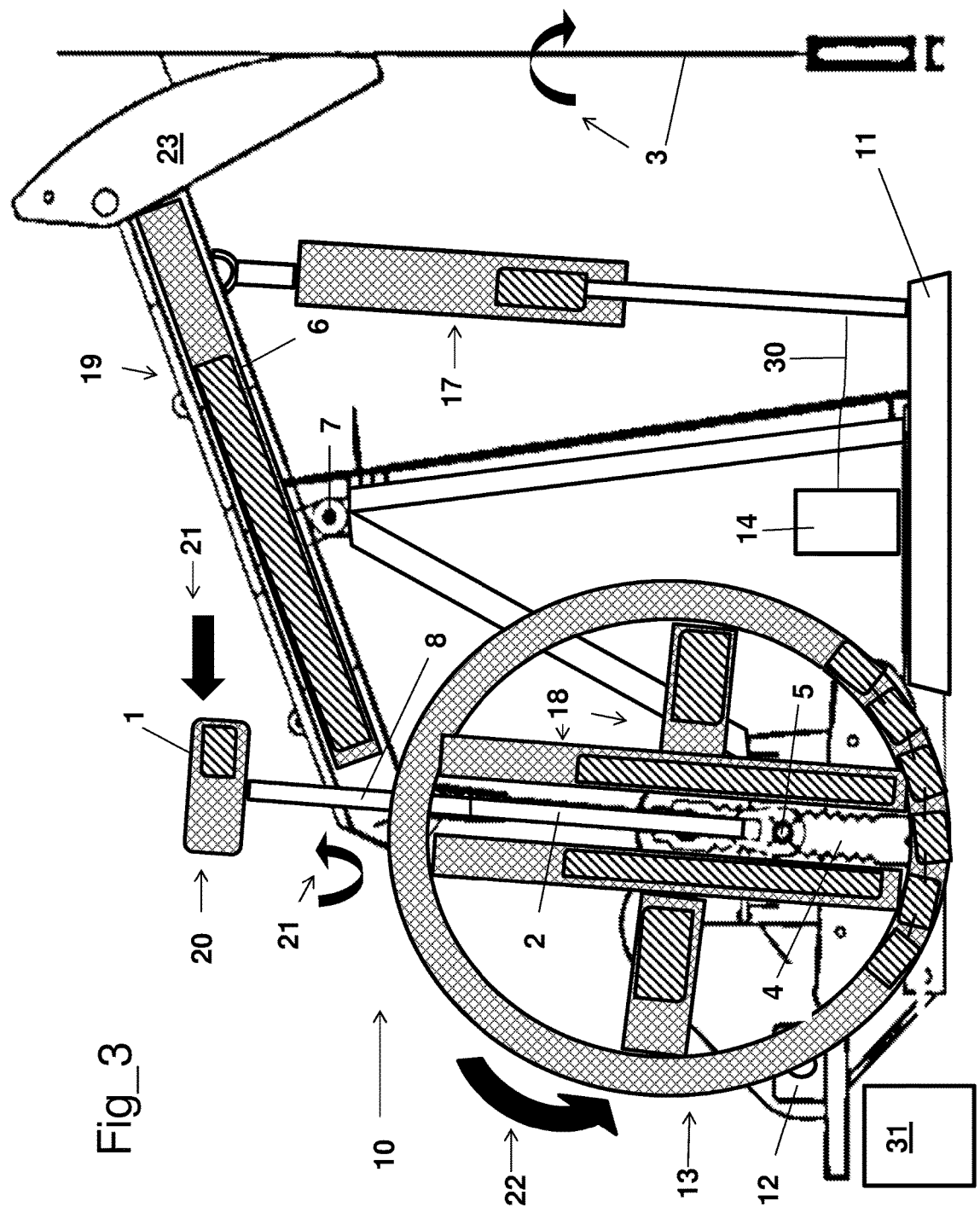
Fig_3

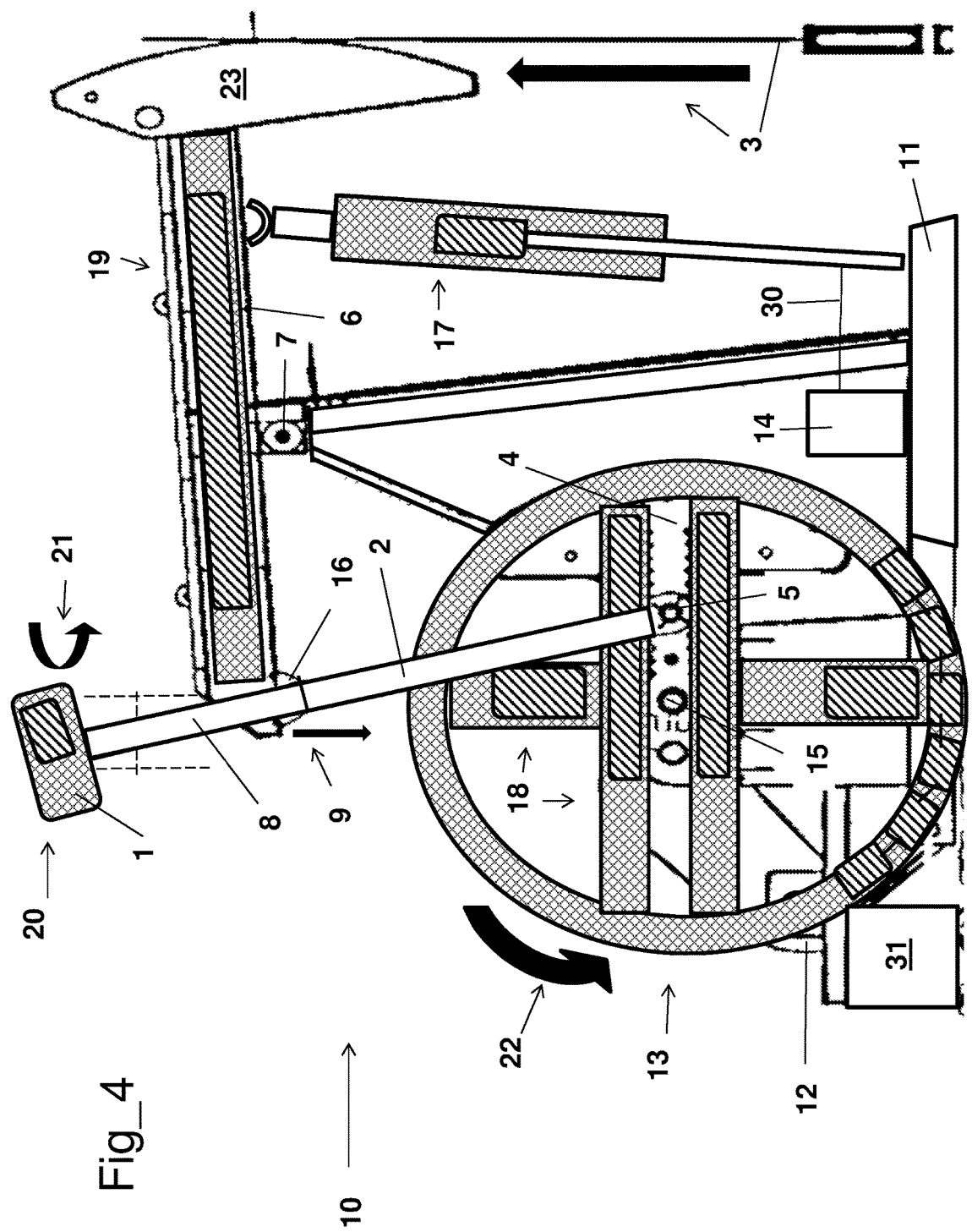
Fig_4

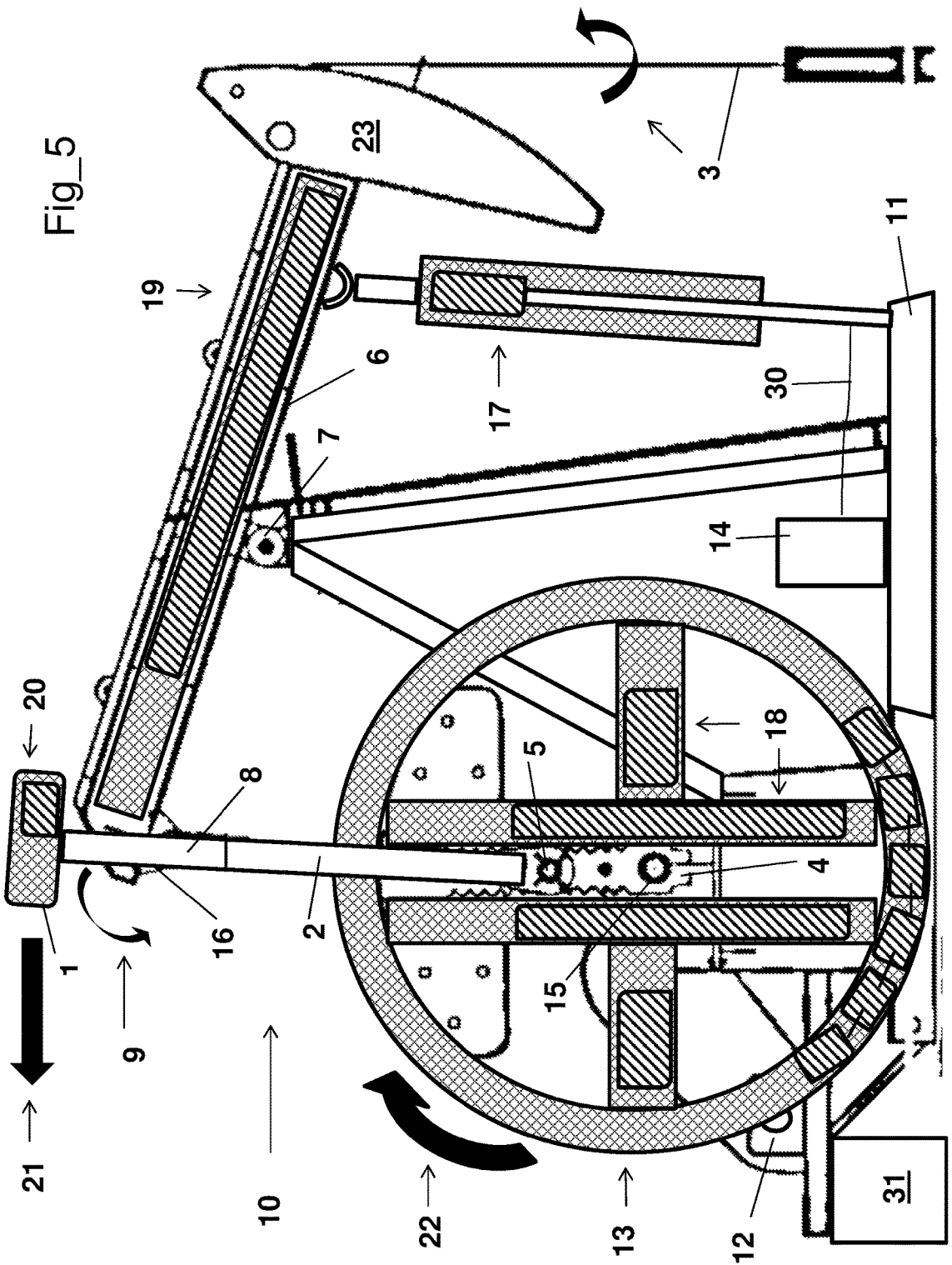

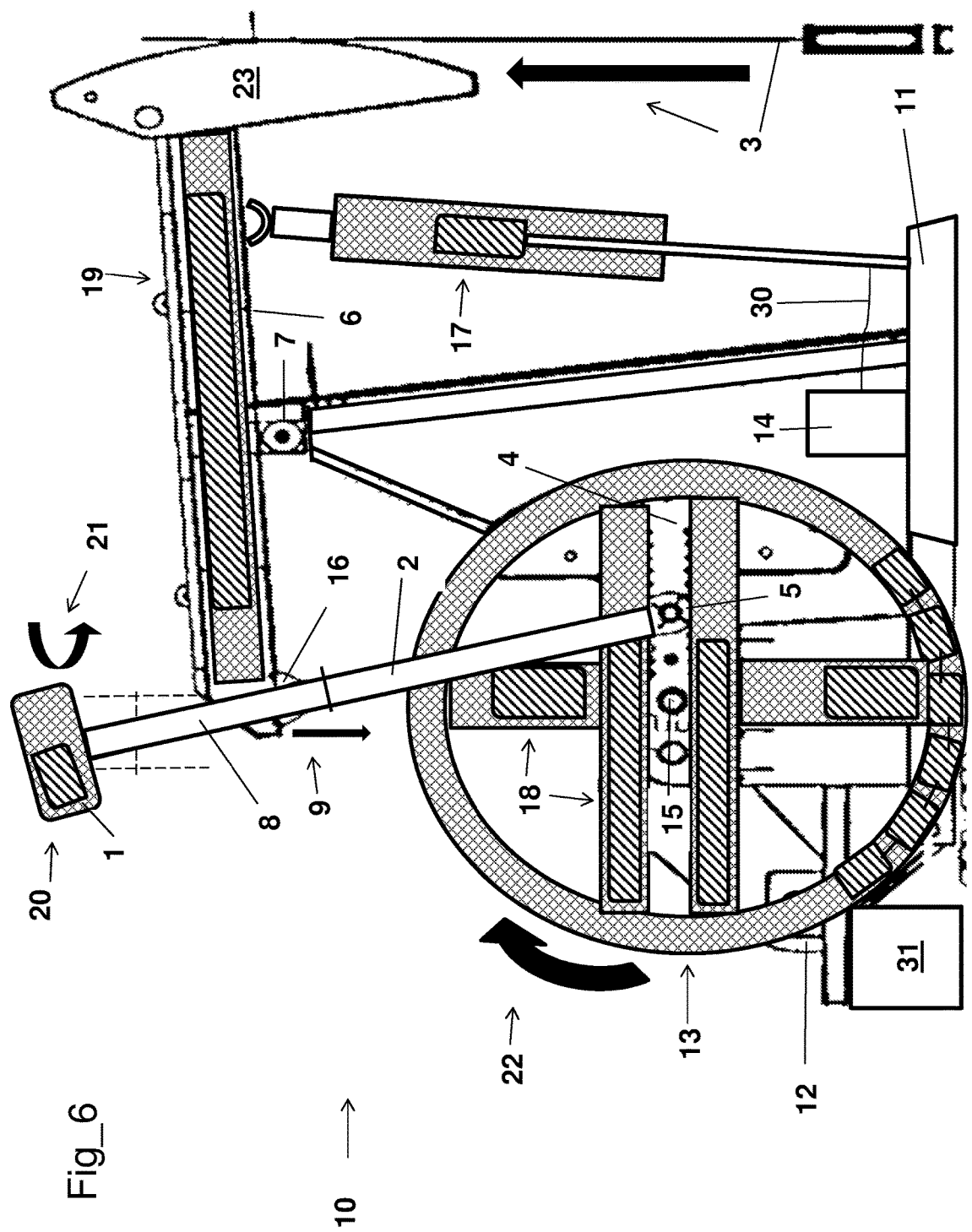

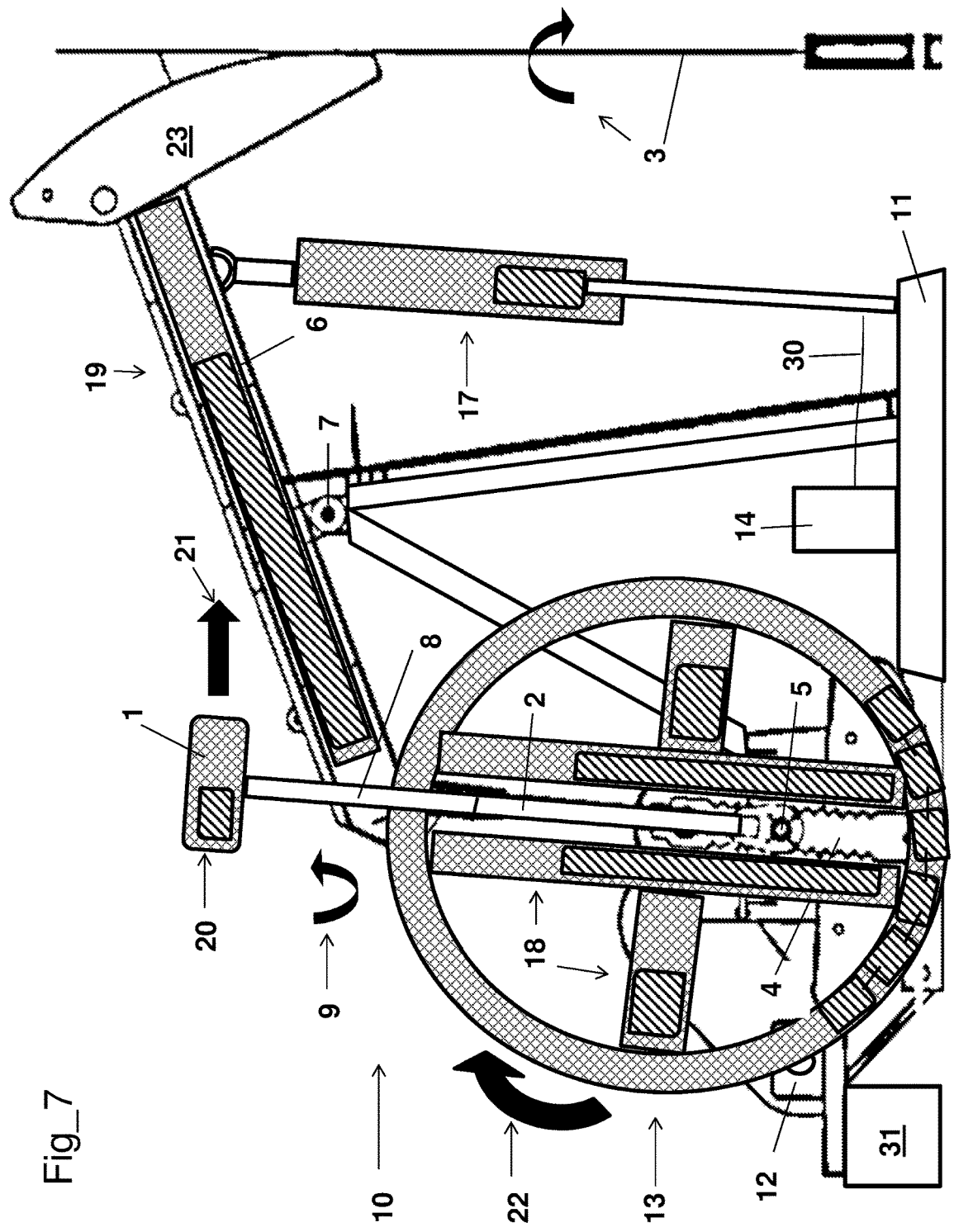
Fig_7

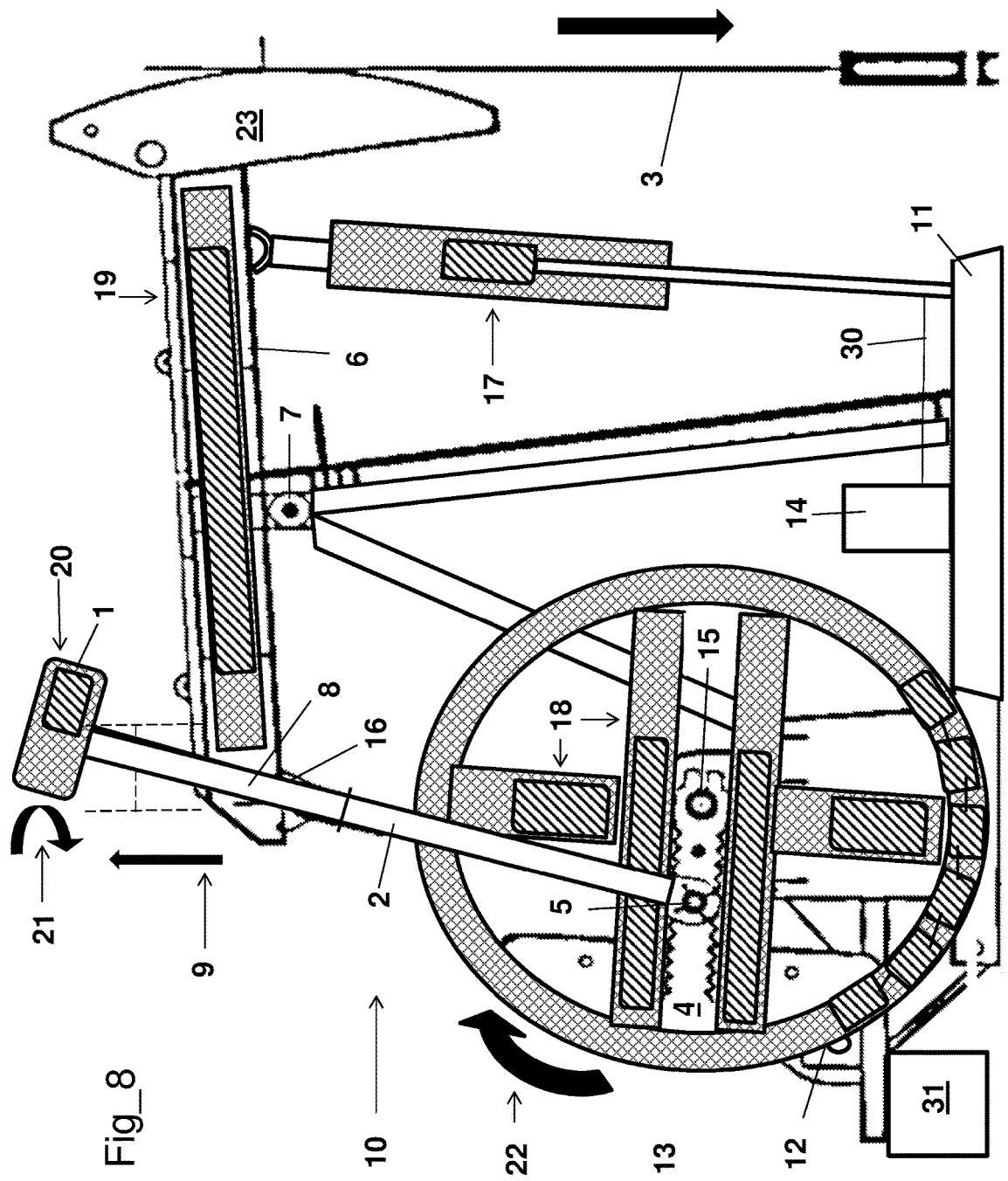
Fig_8

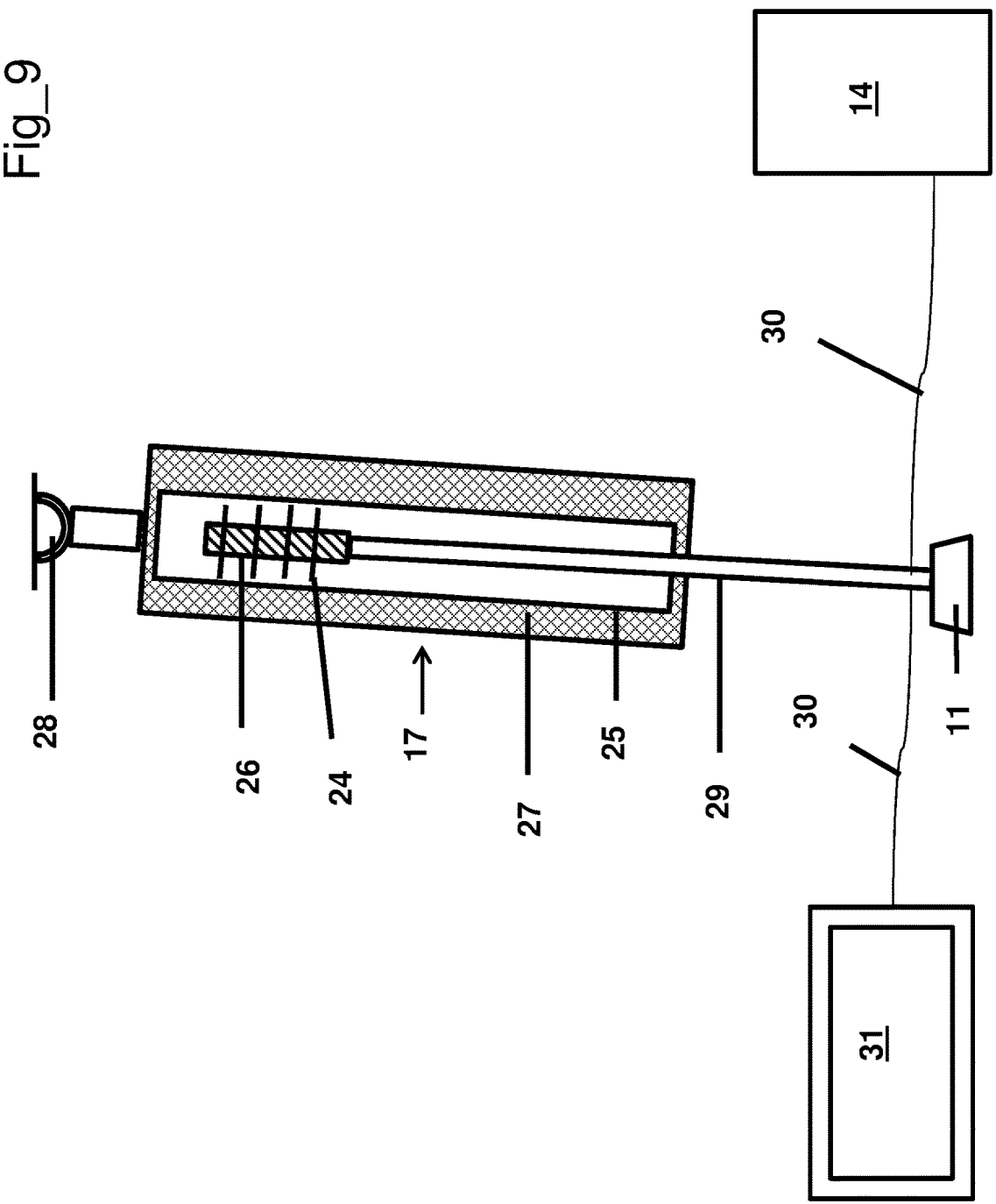
Fig_9

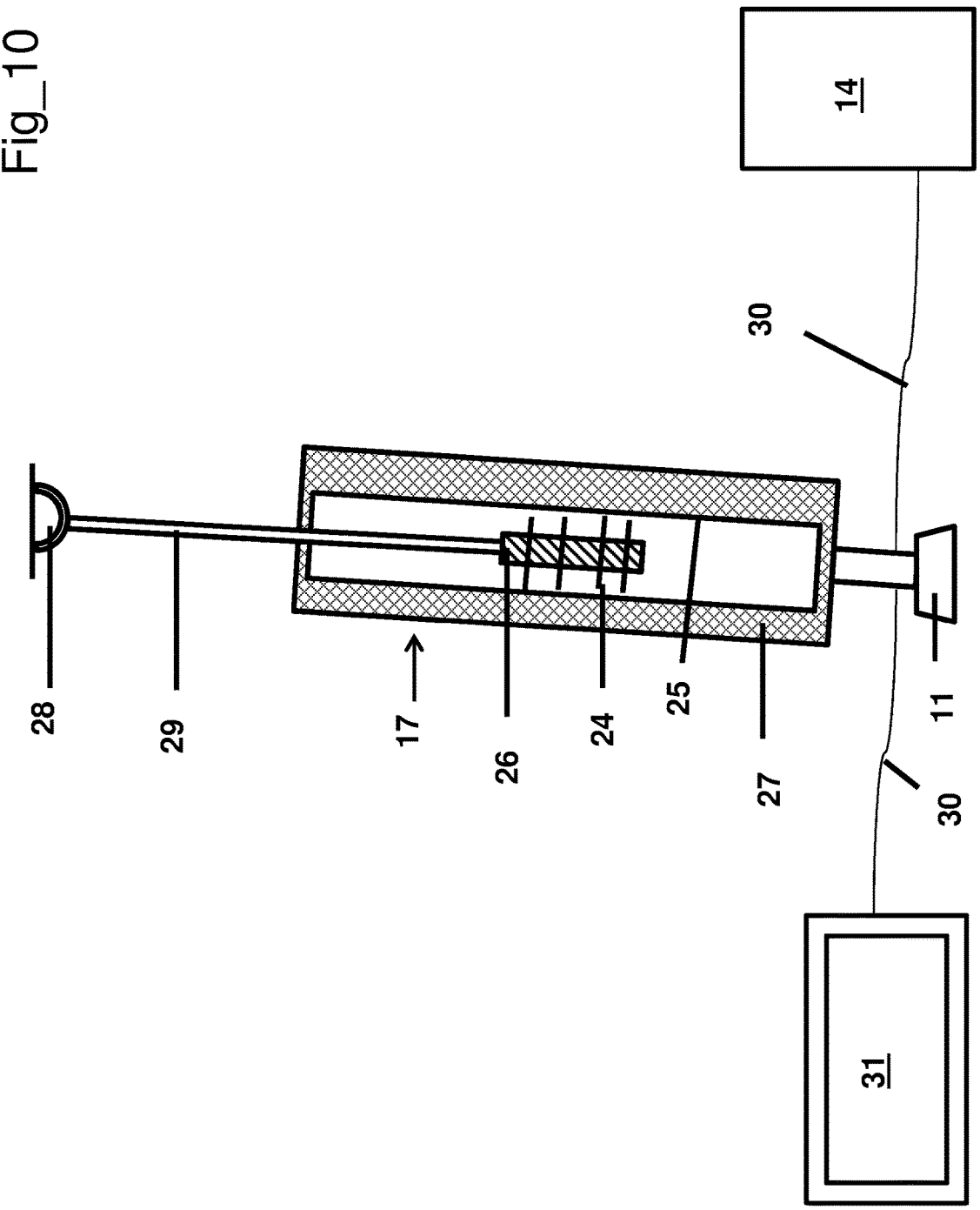
Fig_10

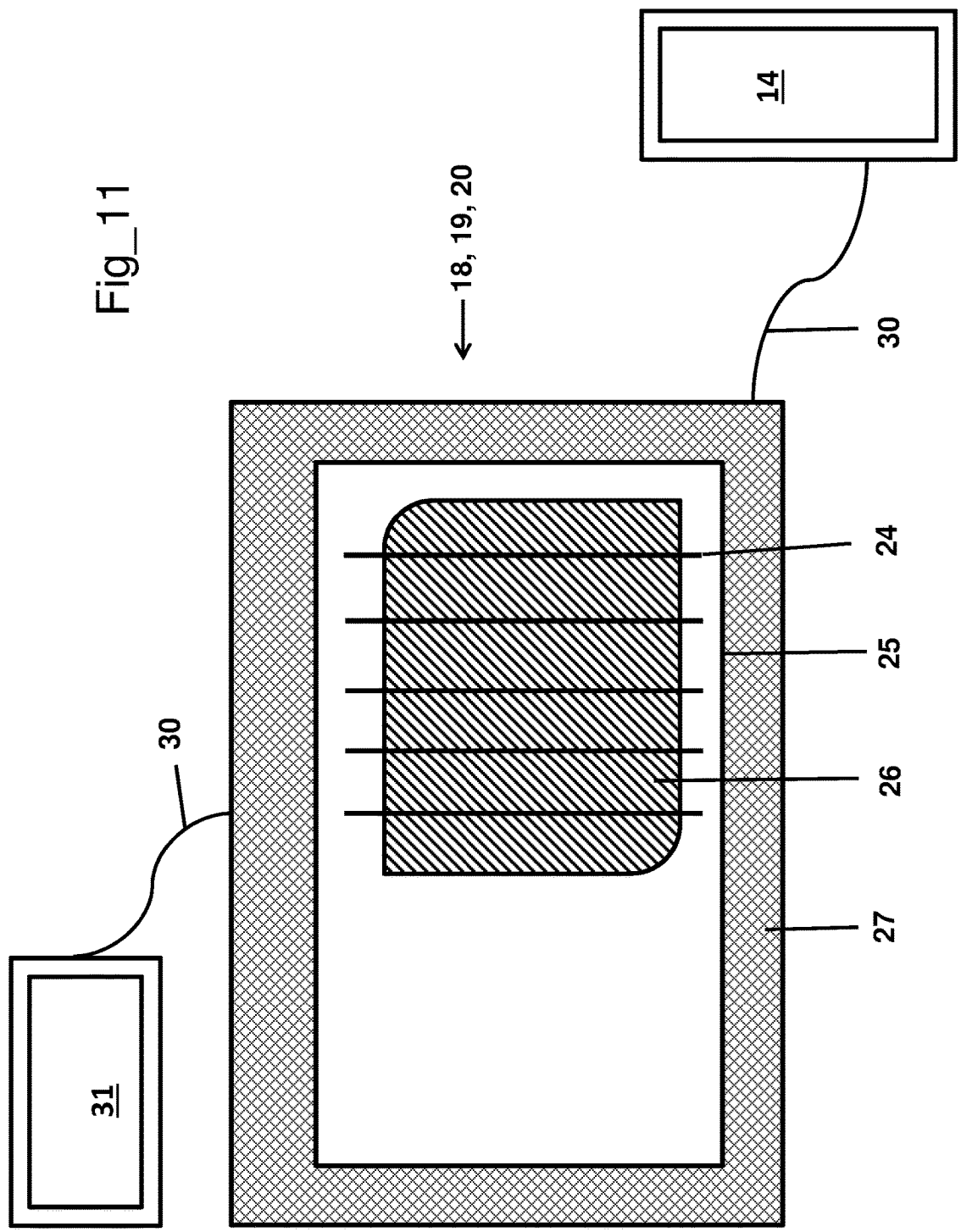

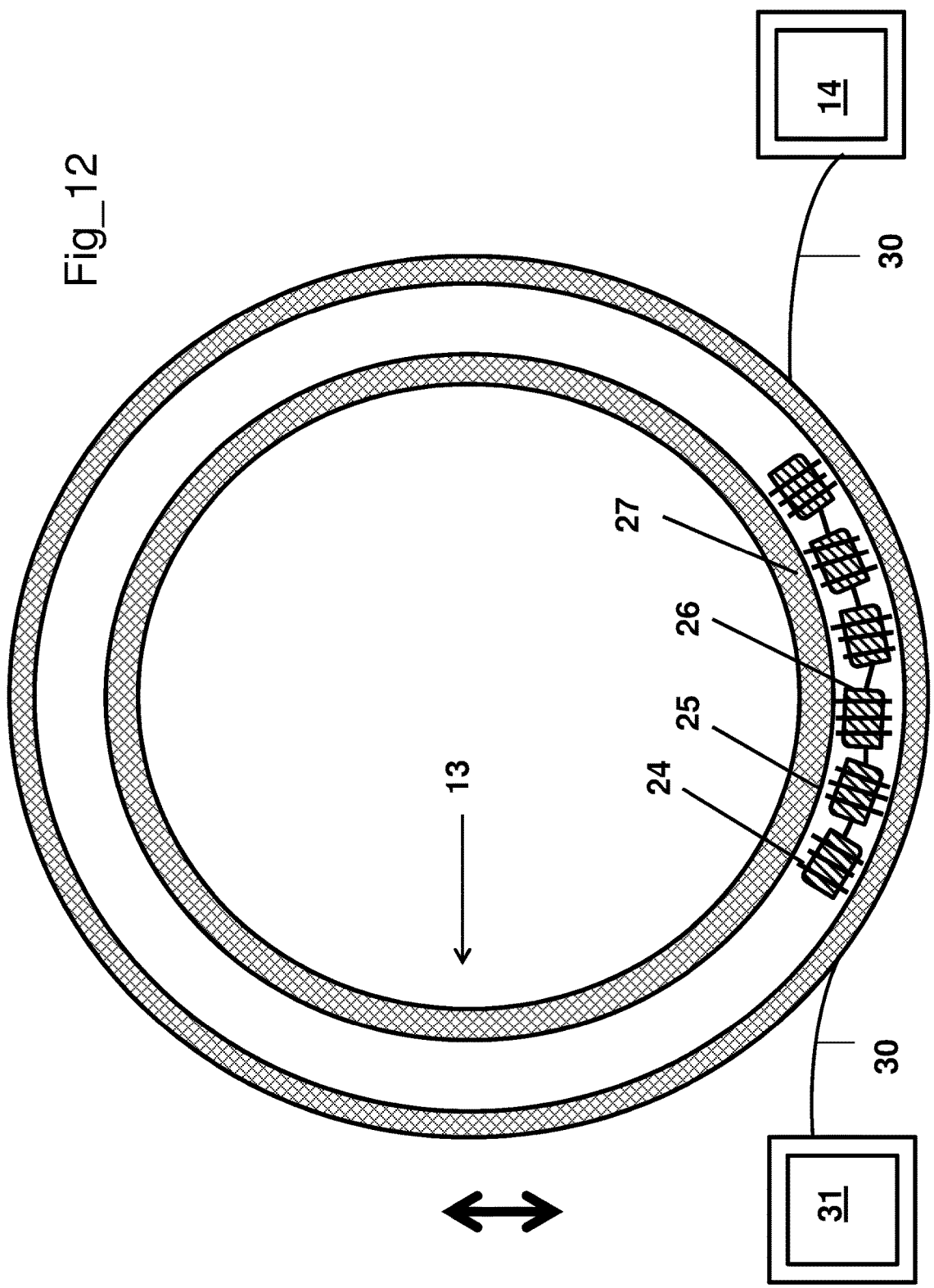

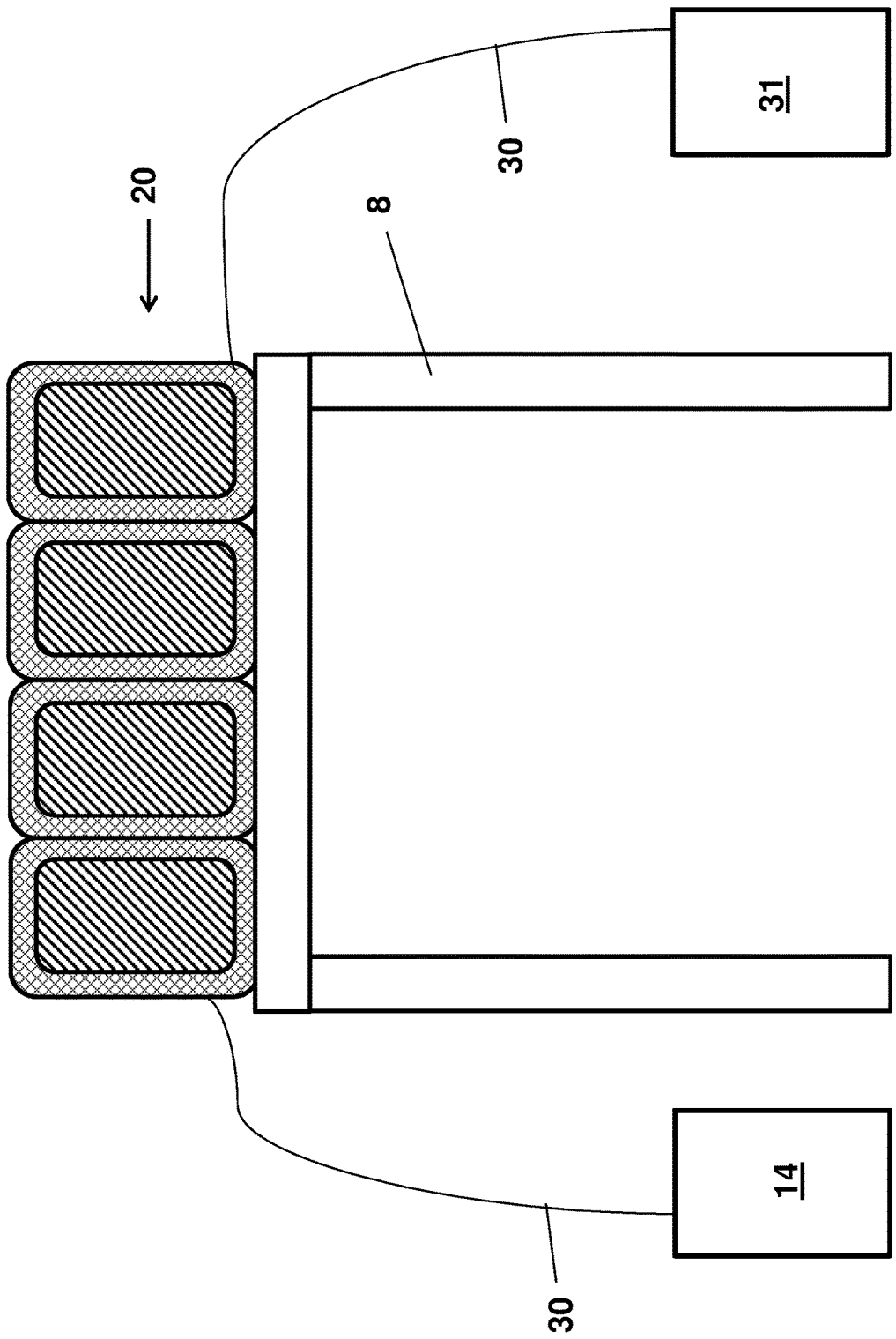

Fig_14

Crank Arm Rotation Toward Well. Articulating Reciprocating Counter Weight position above effort when Crank arms straight up or down Weight position near fulcrum when Crank arms horizontal away from well Weight position away from fulcrum when Crank arms horizontal toward well Near fulcrum is less effective counterweight achieved, and less required weight to lower load Counterweight extended in neutral above lever effort Away from fulcrum is more effective counterweight achieved, to compensate more weight required to raise load

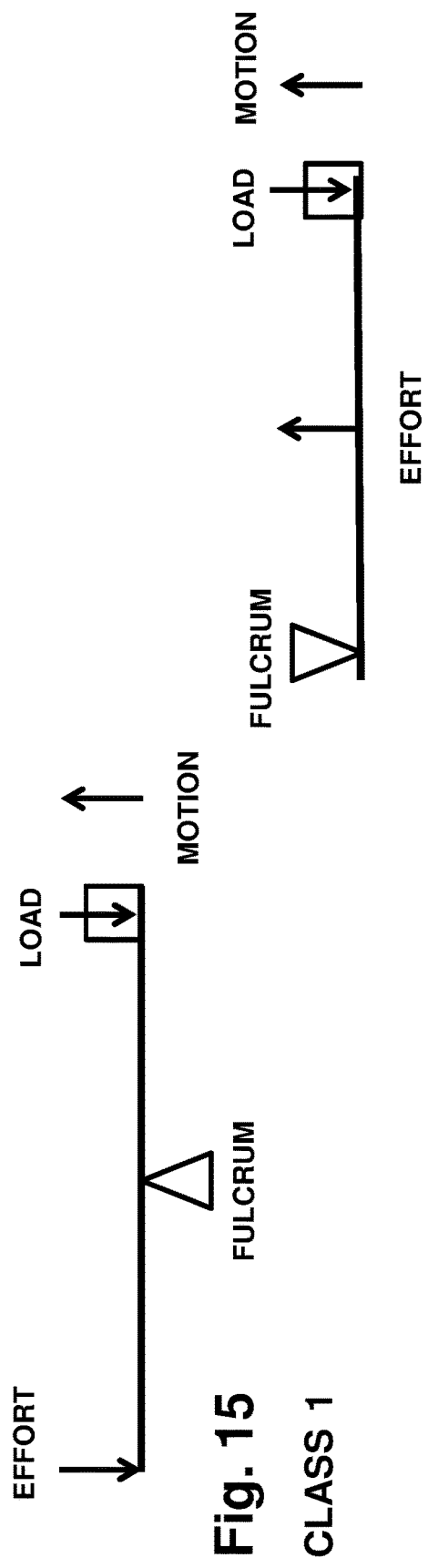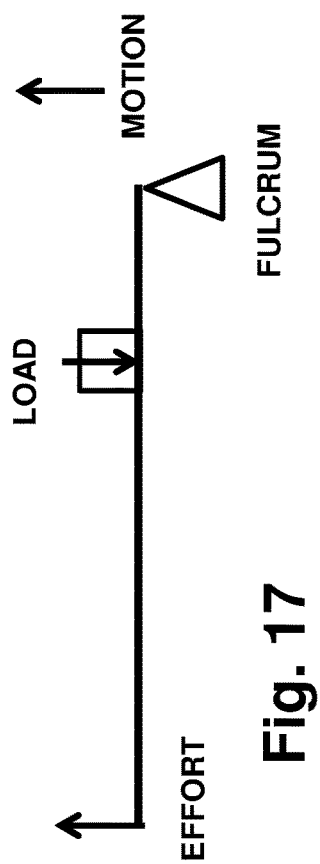
Fig. 15 CLASS 1
Fig. 16 CLASS 2
Fig. 17 CLASS 3

US 10,340,755 B1

ENERGY HARVESTING AND CONVERTING BEAM PUMPING UNIT

CROSS-REFERENCE TO RELATED APPLICATIONS

This application claims priority to and the benefit of the filing of U.S. Provisional Patent Application No. 62/421,410, entitled-"RECIPROCATING WALKING BEAM ENERGY CONVERTING LINEAR GENERATOR", filed on Nov. 14, 2016; U.S. Provisional Patent Application No. 62/403,165, filed on Oct. 2, 2016; Provisional Patent Application No. 62/411,556, filed on Oct. 22, 2016; U.S. Provisional Patent Application Ser. No. 62/426,337, filed on Nov. 25, 2016; U.S. Provisional Patent Application No. 62/535,846, entitled-"RECIPROCATING WALKING BEAM ENERGY HARVESTING AND CONVERTING LINEAR GENERATORS", filed on Jul. 22, 2017; and U.S. Provisional Patent Application Ser. No. 62/535,945, entitled-"POSITION CHANGING EXTENDED COUNTERWEIGHT AS LINEAR GENERATOR FOR RECIPROCATING WALKING BEAM", filed on Jul. 23, 2017; U.S. Non-Provisional patent application Ser. No. 15/719,964, filed on Sep. 29, 2017; Non-Provisional patent application Ser. No. 15/789,760, filed on Oct. 20, 2017; and the specifications and claims thereof are incorporated herein by reference.

BACKGROUND OF THE INVENTION

Field of the Invention (Technical Field)

Embodiments of the present invention relate generally to generating electric current with electro mechanical devices by harnessing existing motion in lifting and lowering loads with a lever as harvested translational and rotational kinetic energy in a reciprocating walking beam pumping unit, and magnetic stored energy in electro mechanical devices.

DESCRIPTION OF RELATED ART

There is a need to lower electric operating costs for those using the current practice of reciprocating walking beam pumping equipment. And currently being introduced for use on reciprocating walking beam pumping units are some auxiliary devices serving as efficiency increasing net torque reducing electro mechanical technologies that require auxilliary electricity to operate. The term "net torque" can be used to describe a quantity of positive or negative torque required to actuate raising or lowering a load after factoring in an attempt to introduce counterbalance effect with counterweight in order to reduce the torque; the example in this description is a reciprocating walking beam for well pumping. Whereas "gross torque" can be used to describe a quantity of torque required to raise or lower a load without counterbalance effect, an example could be a weight lifting exercise machine whose very purpose is to be heavy.

Gravity is a natural force being countered with the reciprocating walking beam counterweight which results in counterbalance effect. In the current practice, with an amount of load and an amount of counterbalance effect the net torque required to reciprocate the walking beam for well pumping still requires external power to facilitate movement. Once in motion it has kinetic energy and the kinetic energy is underused in current practice.

When electric power is available the walking beam pump operators can purchase electricity and operate with an electric prime mover as cost incurred operating expense. If no electricity is available the prime mover can be a natural gas or propane or other fueled engine and incur the cost of fuel. On modern leases it is usually considered inconvenient not to have electricity available to operate the prime mover and the ever more sophisticated and integrated electro mechanical auxiliary devices and controls.

BRIEF SUMMARY OF EMBODIMENTS OF THE PRESENT INVENTION

Embodiments of the present invention relate to generating and conserving electricity to use for operating walking beam pumping units and for operating in conjunction with auxiliary devices like technology to make lifting and lowering loads more economical. In one embodiment of this invention the traditional electric source and supply for operation of electric prime mover can be supplemented.

The lifting and lowering of the load with a walking beam pumping unit is caused by the reciprocating motion of a walking beam tipping on a fulcrum. This description now addresses the class 1 lever and class 3 lever walking beam pump where circular motion is transferred from the prime mover to the speed reducer to the crank arms and then converted to linear motion with the crank arms wrist pins connected to the pitman arms which connect to the tail bearing and reciprocating beam.

In one embodiment of this invention the walking beam pumping unit has harvestable rotational kinetic energy from the crank arms, and translational kinetic energy from the load, and translational kinetic energy from the beam which is harvested and converted to electric current by the electric current generating devices of this invention.

This invention is power assistance which is power generation and power conservation for a walking beam pumping unit by utilizing multiple-onboard above-ground surface linear electro mechanical devices, and also circular electro mechanical devices that both generate electric current and also reverse the current flow to be motors. This plurality of onboard multiple electro mechanical devices have an above-ground surface "stator" which is the stationary part of the electro mechanical device. The onboard above-ground surface stator can be either linear or circular. This plurality of multiple onboard electro mechanical devices have an above-ground surface "translator" which is the moving element of an electro mechanical device. The onboard above-ground surface translator can be free standing and encased within the stator housing, and thus unattached moves partially from gravitational force induced from fluctuating and changing angular displacement of moving linkages. Or it can be fixed in various ways and attached to linkage members such as the crank arms, walking beam, foundation sub-structure, or a skid also known as runners.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention.

Important to note: To understand the drawings please use the descriptive key found below, and in particular note the graphic drawing symbols below used for translator and stator core:

26 Translator graphic drawing symbol 

27 Stator core graphic drawing symbol 

In the drawings:

FIG. 1 is a front view of the electro mechanical device positions showing the plurality of multiple translator and stator position when the crank arm is straight up with the crank rotation away from the well at crank angle 0 degrees and so entering this 0 degree angle with the well load moving upwards but leaving this angle with the well load movement downwards;

FIG. 2 is a front view of the electro mechanical device positions showing the plurality of multiple translator and stator position when the crank arm is horizontal toward the well with the crank rotation away from the well at crank angle 270 degrees and so entering this 270 degree angle with the well load moving upwards.

FIG. 3 is a front view of the electro mechanical device positions showing the plurality of multiple translator and stator position when the crank arm is straight down with the crank rotation toward the well at crank angle 180 degrees and so entering this 180 degree angle with the well load moving upwards but leaving this angle with the the well load moving downwards.

FIG. 4 is a front view of the electro mechanical device positions showing the plurality of multiple translator and stator position when the crank arm is horizontal away from the well with the crank rotation toward the well at crank angle 90 degrees and so entering this 90 degree angle with the well load moving downwards.

FIG. 5 is a front view of the electro mechanical device positions showing the plurality of multiple translator and stator position when the crank arm is straight up with the crank rotation toward the well at crank angle 0 degrees and so entering this 0 degree angle with the well load moving downwards but leaving this angle with the well load movement upwards;

FIG. 6 is a front view of the electro mechanical device positions showing the plurality of multiple translator and stator position when the crank arm is horizontal toward the well with the crank rotation toward the well at crank angle 90 degrees and so entering this 90 degree angle with the well load moving upwards.

FIG. 7 is a front view of the electro mechanical device positions showing the plurality of multiple translator and stator position when the crank arm is straight down with the crank rotation toward the well at crank angle 180 degrees and so entering this 180 degree angle with the well load moving upwards but leaving this angle with the well load moving downwards.

FIG. 8 is a front view of the electro mechanical device positions showing the plurality of multiple translator and stator position when the crank arm is horizontal away from the well with the crank rotation toward the well at crank angle 270 degrees and so entering this 270 degree angle with the well load moving downwards.

FIG. 9 is a front view of beam actuated reciprocating piston type linear generator, the BALG energy converter assembly preferred embodiment FIG. 10 is a front view of beam actuated reciprocating piston type linear generator, a BALG energy converter assembly alternate embodiment FIG. 11 is a front view of Linear electro mechanical device device with free standing translator FIG. 12 is a front view of Circular electro mechanical device with translator train FIG. 13 is a front view of to and fro linear generator, electro mechanical device energy converter assembly for swaying-to-and-fro, angular-displacement-changing, articulated-reciprocating linear generator FIG. 14 is to and fro linear generator, electro mechanical device energy converter assembly position diagram for swaying-to-and-fro, angular-displacement-changing, articulated-reciprocating linear generator FIG. 15 is a front view of Class 1 lever diagram showing the corresponding positions of the effort, fulcrum, and load FIG. 16 is a front view of Class 2 lever diagram showing the corresponding positions of the effort, fulcrum, and load FIG. 17 is a front view of Class 3 lever diagram showing the corresponding positions of the effort, fulcrum, and load

DESCRIPTIVE KEY 1 swaying-to-and-fro linear generator stator core
2 pitman arm
3 well load
4 crank arm
5 wrist pin
6 walking beam
7 fulcrum
8 extended pitman arm
9 effort
10 walking beam pumping unit
11 foundation
12 prime mover
13 circular electro mechanical device
14 capacitor
15 crank shaft
16 tail bearing
17 BALG, beam actuated reciprocating piston type linear generator
18 CALG, crank arm linear generator
19 WBLG, walking beam linear generator
20 STFLG, swaying-to-and-fro linear generator
21 direction of STFLG, swaying-to-and-fro linear generator
22 crank arm direction
23 head
24 magnet
25 coil
26 Translator graphic drawing symbol 
27 Stator core graphic drawing symbol 
28 coupling
29 rod
30 wiring
31 controller comprising: microprocessor, PLC, microcontroller, VFD/VSD, voltage controller, static power converter

DETAILED DESCRIPTION OF THE INVENTION

As used throughout this application, the term "linear electro mechanical device" is intended to mean a linear generator that can also serve as a linear motor by reversing the current flow; an electrical and mechanical component with linear movement and can be referred to as but not limited to one or more of linear electric actuator, linear electric generator, linear induction actuator, linear permanent magnet synchronous actuator, linear reluctance synchronous actuator, linear stepper actuator, linear switch reluctance actuator, is used for the sake of simplicity and is not intended to limit the ability to generate a magnetic field.

As used throughout this application, the term "circular electro mechanical device 13" is intended to mean a circular linear generator that can also serve as a circular linear motor by reversing the current flow; an electrical and mechanical component with rotary movement and can be referred to as but not limited to one or more of rotary electric actuator, rotary electric generator, rotary induction actuator, rotary permanent magnet synchronous actuator, rotary reluctance synchronous actuator, rotary stepper actuator, rotary switch reluctance actuator, is used for the sake of simplicity and is not intended to limit the ability to generate a magnetic field.

As used throughout this application, the term "translator 26" is intended to mean the moving element of an electro mechanical device, and the translator 26 can be freestanding and unattached, or it can be fixed and attached. The term "translator 26" when referring to a linear generator, is used for the sake of simplicity and is not intended to limit the ability to generate a magnetic field, instead, the term "translator 26" when used in the context of moving with reference to a stator is intended to include any and all manners of moving a magnetic field across one or more stator surfaces, including but not limited to moving the translator via gravity, linkages, or a rod, and can be referred to as but not limited to a rotor, forcer, or a mover.

As used throughout this application, the term "stator 27" is intended to mean the stationary part of an electro mechanical device and the stator 27 can be either linear or circular. The term "stator 27" when referring to a linear generator, is used for the sake of simplicity and is not intended to limit the ability to generate a magnetic flux, instead, the term "stator 27" when used in the context of a translator 26 moving within, is intended to include any and all manners of generating a magnetic field or magnetic flux across one or more surfaces, including but not limited to coils, windings, magnet, or electromagnet, and can be referred to as but not limited to a rail or a track.

As used throughout this application, the term "walking beam 6" is intended to mean the lever used to raise and lower a load 3. The term "walking beam 6" when referring to a lever used to raise and lower a load 3, is used for the sake of simplicity and is not intended to limit the reciprocating nature of the beam, instead, the term "walking beam 6" when used in the context of a reciprocating walking beam 6 is intended to include any and all manners of the lever used to raise and lower a load 3 and can be referred to as but not limited to a pumping unit 10, downhole pump, reciprocating pump, or sucker rod pump, and many other slang terms including nodding donkey and pumpjack.

As used throughout this application, the acronyms BALG is intended to mean beam actuated reciprocating piston type linear generator, CALG is intended to mean crank arm linear generator, WBLG is intended to mean walking beam linear generator, and STFLG is intended to mean swaying-to-and fro linear generator.

As used throughout this application, the term "counterbalance" is intended to mean the amount of effective weight the dead weight of the block of weight called "counterweight" must exert to affect a desired result on a well load 3. The term "weight" and "dead weight" when referring to a "counterweight", is used for the sake of simplicity and is not intended to limit the "counterweight", instead, the term "weight" and "dead weight" when used in the context of the "counterweight" is intended to include any and all manners of a "counterweight", including but not limited to counter weight and counter-weight, any material comprising a block of weight for counterweight, and moveable weight for counterweight.

As used throughout this application, the term "net torque" is intended to mean the amount of torque that speed reducer or prime mover 12 must exert to affect a desired result on a well load 3 and when counterbalance effect exceeds the well load 3 it can be a negative value.

As used throughout this application, the term "unbalanced load" on a walking beam pumping unit is intended to mean where the load in the lift direction exceeds the load in the return direction due to downhole pump action lifting the weight of fluid and buoyant weight of the rods but lowering only the buoyant weight of the rods.

As used throughout this application, the term "member" is intended to mean a constituent piece of a complex structure. As used throughout this application, the term "linkage" is intended to mean the state of being linked or the action of linking, the existence or forming of connections. As used throughout this application, the term "element" is intended to mean a structural component such as frame members, and mechanisms that control movement, and control components.

In accordance with embodiments of the invention, the best mode is presented in terms of the described embodiments, herein depicted within FIGS. 1 through 17. However, the disclosure is not limited to the described embodiments and, upon studying the instant application, a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. It should also be understood that the sizes and relative orientations of the illustrated elements are not shown to scale, and in some instances they have been exaggerated for purposes of explanation.

FIGS. 15, 16, and 17 illustrate example geometrical embodiments of the present invention in conjunction with class 1, class 2, and class 3 levers of which the class is determined by their respective disposition of load, fulcrum, and effort.

Of the many applications that embodiments of the present invention apply to, now consider an embodiment of the present invention as applied to class 1 lever, in this particular example conventional crank weight walking beam pumping unit 10 where circular motion is transferred from prime mover 12 to speed reducer 13 and rotating crank arm 4 and then converted to linear motion with crank arm 4 crank wrist pin 5 articulated with pitman arm 2 connected to equalizer cross beam with a tail bearing 16 connected to walking beam 6 at the effort 9.

The current practice of providing outside electric supply for operation by electric prime mover 12 is intended to be supplemented with electro mechanical embodiments of this invention including but not limited to linear generators. The purpose of this invention is to conserve electricity to use as power to operate walking beam pumping units 10 and for operating auxiliary equipment and controls including devices to make lifting and lowering loads more efficient and economical.

The walking beam 3 for a down hole pumping unit 10 has rotational kinetic energy from the crank arms 4, and translational kinetic energy from the load 3, and translational kinetic energy from the walking beam 6 which is converted to electric current or induced voltage by the electro mechanical current generating devices of this invention utilizing magnetic stored energy as magneto motive force.

Certain embodiments of the invention are electro mechanical devices and can include one or more of but not limited to linear or rotary electric actuator, linear or rotary electric generator, linear or rotary induction actuator, linear or rotary permanent magnet synchronous actuator, linear or rotary reluctance synchronous actuator, linear or rotary stepper actuator, and linear or rotary switch reluctance actuator.

In one embodiment a controller 31 with one or more of but not limited to a variable frequency drive (VFD), programmable logic controller (PLC), micro controller, microprocessor, static power converter, pulse width modifier (PWM), and voltage controller, rapidly switches electro mechanical devices between motoring and generating to maximize electric conservation.

In one embodiment phase currents can be referenced then calculated in a microcontroller, and current sensors and current controllers can reproduce them by using pulse width modulation (PWM) through a static power converter with high switching frequency.

In one embodiment a controller 31 switches between resistance and conductor, where normal is attraction and thrust is controlled by frequency constant in amplitude, and switching optimization is anticipated with a machine learning algorithm.

The FIG. 1-8 illustrate embodiments of the electro mechanical devices which are either gravity actuated freestanding translators 26 as is the swaying-to-and-fro linear generator STFLG 20 and some on the walking beam 6 or mechanically actuated fixed translators 26 as is the beam actuated piston linear generator BALG 17; and also the circular linear electro mechanical device 13 on the crank arm 4 can have a mechanically fixed train of translators 26. The translators 26 are either linear motion or circular motion as illustrated, from movement that utilizes changing angular displacement from the existing motion of the linkages that reciprocate the walking beam 6 of a walking beam pumping unit 10 as a class 1 lever.

In one embodiment a plurality of electro mechanical devices disposed at different positions on the reciprocating walking beam pumping unit 10 harvest the existing motion and kinetic energy which is converted to electricity through induction such that the plurality of onboard above surface electro mechanical devices provide mostly continuous translator 26 movement, either freestanding or fixed, to generate magnetic flux and electric current or induced voltage which can be is sent to a capacitor for distribution.

In one embodiment of this walking beam pumping unit with linear generators, a plurality of translators 26 moving in relation to stators 27 can be positioned on the walking beam 6, and in another positioned on the swaying-to-and-fro linear generator 1 and in another one or more of crank arm linear generators 18 can be mounted on the crank arms 4, and those crank arm stator housings can also provide support for the circular electromechanical device 13 that rotates attached to the crank arms 4 with a train of one or more of pivotably coupled translators 26 that in one embodiment are free standing and under the influence of gravity, or in another embodiment of circular electro mechanical device 13 one or more of translators 26 are anchored to a stationary sub-structure to remain stationary within the rotating circular electro mechanical device 13 that is attached to the rotating crank arms 4.

In one embodiment of the invention, electro mechanical devices can be mounted wherever feasible on any moving part, such as the head 23, pitman arm 2, and extended pitman arm 8.

In one embodiment of the invention, linear generators are mounted on the walking beam 6, on both sides of the beam's web and between the beam flanges. The translators 26 move by gravity in relation to the stators as the walking beam 6 reciprocates at the fulcrum 7 moving up and down at the well load 3 attached to the head 6 and up and down at the effort 9 at the tail bearing 16. The motion reversal rapidity is more or less 8-10 beam reciprocations per minute which causes about 16-20 translator reversals per minute which is about 23,000 reversals per day. Translator reversal as regenerative braking can also be harnessed.

FIG. 9 illustrates one embodiment and FIG. 10 illustrates an alternate embodiment of the invention as a walking beam actuated reciprocating piston linear generator BALG 17 whose motive force is initiated as torque from the prime mover 12 and then translated to kinetic energy in the reciprocating walking beam pumping unit 10 which causes movement with mechanical fixed linkage of the translator 26 in relation with the stator housing core 27, and is connected by clamps or in some manner pivotably coupled at it's top flange to the lower flange of the walking beam 6 and also pivotably coupled to a foundation 11 on the lower extremity of the pumping unit 10 structure. The foundation 11 can be a steel beam skid or runners, or steel braces for the steel beam skid or runners at the base of the pumping unit 10 structure. FIG. 9 and FIG. 10 illustrate embodiments of walking beam 6 actuated reciprocating piston type electro mechanical device, BALG 17, so to generate electric current which can be sent to a capacitor for distribution, or to the prime mover from electric current received from the capacitor; and on/off switching or current reversal for motoring is instructed by controller 31 based on the power allocation logic inputs.

FIG. 11 illustrates detail of one embodiment of crank arm 4 linear generators, which in the embodiments of FIG. 1-8 illustrations there can be four rails on each crank arm 4 with two disposed parallel to the length of the crank arms and two disposed perpendicularly. Some motoring will be desirable to optimize creating negative counterweight moments.

Lengths, width, diameter, and placement of the linear generators are discretionary design options to be determined for specific applications.

FIG. 12 illustrates detail of the circular generator 13 which in FIG. 1-8 illustrations attaches to multiple supports where deemed necessary on the crank arm 4, such as attachment to the linear generators 18 which in FIG. 1-8 are disposed parallel to the crank crams and also those crossing perpendicularly thereby supporting the circular stator housing 13.

The circular electro mechanical device 13 generator rapidly switches between generating and motoring to intelligently control flux resistance to assist lift efficiency. Optionally, either gravity for free standing translators, or attachment to the sub structure for fixed translators, holds the translators disposed in the neutral weight down position near the bottom of the circular electro mechanical device 13 stator housing as it circles, while controller 31 signals switching between motoring and generating current direction so to optimize electrical conservation for the apparatus during load fluctuation.

FIG. 13 illustrates detail of the swaying-to-and-fro linear generator stator core 1 for swaying-to-and-fro linear generator STFLG 20 on extended pitman arms 8 above the effort 9 and walking beam 6 and attached to the pitman arms 2 such that the extended pitman arms 8 move swaying to and fro causing changing angular displacement of the linear generator resulting in gravitational movement of the free standing translators. The translator can also change position by motoring if desired.

FIG. 14 is a position flow chart of the changing angular displacement of the swaying-to-and fro linear generator STFLG 20. And in this teaching in this embodiment while at the same time as generating electric current as the force of gravity causes movement of a translator 26 in relation with a stator 27, the changes in angular displacement caused by the leverage of the extended pitman arm 8 structurally rising above the effort 9 mechanically positions the swaying-to-and-fro linear generator 1 nearer to both well load 3 and fulcrum 7 which de facto decreases the counterbalance effect, and then sways to re-position away from well load 3 and fulcrum 7 which de facto increases the counterbalance effect on class 1 adjustable crank weight pumping units 10 and beam weight units.

FIGS. 15, 16, and 17 illustrate the geometric relationship of load 3, fulcrum 7, and effort 9 of lever class 1, 2, and 3.

In current practice the prime mover 12 is using electricity most of the time and is regenerating less of the time. But the embodiments of the electro mechanical devices of this invention are an improvement in that in moments of negative torque more electro mechanical devices are generating current which is sent to a capacitor for distribution.

Efficiency increasing auxiliary equipment that requires auxiliary power like the moving counterweight assembly on the walking beam 10 can reduce net gear torque and required prime mover amperage but also requires energy to move the weights so the linear generators of this invention are intended to cause and aid an overall net increase of apparatus efficiency. A moving counterweight assembly on the walking beam 10 can be programmed to cause negative torque which increases the kinetic energy available to the linear generators and is regenerative.

In one embodiment the present invention supplies electric current for auxiliary electrical devices and controllers. For instance, supplying power to run an air compressor or any electric device that can be used to actuate a moving beam counterweight. Another embodiment can assist to power auxiliary electric motors for other uses, for instance an air compressor for air balance type pumping unit.

In one embodiment of this ENERGY HARVESTING-CONVERTING BEAM PUMPING UNIT rotating kinetic energy of the crank arms and the translational kinetic energy of the load 3 can be calculated. Kinetic energy is transferred to the translators:

and depends on mass (m) and speed (v) where twice the speed equals four times the kinetic energy:

Translational KE (kinetic energy)=0.5 $(m)(v^2)$

The rotational motion of the crank arms 4 cause a maximum moment of the rotary crank weights, crank shaft, and crank arm wrist pins 5 about the crankshaft 15 in inch-pounds, which is nominally the maximum effective crank arm 4 counterbalance effect at about 90 degrees and 270 degrees. 90 degrees and 270 degrees are nominally the positions of maximum torque and effective counterbalance.

θ=crank position (inclinometer on beam, magnet/transducer on pedestal),

W=polished rod load (load cell) at any specific crank angle.

M=maximum moment of the rotary counterweights (from manufacturer or computed from measurements), TF=torque factor for a given crank angle (from manufacturer's tables or computed from geometric measurements), B=structural unbalance (from manufacturer or measured), are programmed values. With these input values Tn=net torque are computed.

Where TN=TF(W−B)−M SIN θ

Load×Distance from tipping point=Counterweight Mass× Distance from tipping point and is called load moment.

ECB (effective counterbalance)~Buoyant weight of rods+ ½ fluid load on pump plunger.

Lowest speed reducer torque loads on reciprocating beam pumps 10 occur at top and bottom of stroke, 0 degrees and 180 degrees, because of low torque factor from unit geometry. And peak speed reducer torque loads occur at high torque factor 90 degrees and 270 degree crank arm 4 angles which are nominally equal when the reciprocating walking beam 6 pumping unit is "balanced".

Negative torque when counterbalance effect exceeds the well load 3 can drive these generator/motors but negative torque should be limited by the speed reducer maximum torque rating.

Net torque (Tn)=9.53×kilowatt (kw)×efficiency (eff)/ strokes per minute (SPM)×speed variation of power transmission (SV).

Torque factor (TF) is used to convert polished rod load to torque (Nm).

Torque due to net well load (TWN)=torque factor (TF)× well load (WN).

Net well load (WN)=well load (W)−unit unbalance (SU).

Load×Distance from tipping point=Counterweight Mass× Distance from tipping point and is called load moment.

And:

ECB (effective counterbalance)~Buoyant weight of rods+ ½ fluid load on pump plunger.

The foregoing embodiments have been presented for the purposes of illustration and description. They are not intended to be exhaustive or to limit the invention and method of use to the precise forms disclosed. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A walking beam type pumping unit including at least one of onboard above ground surface energy harvesting electric current generating device and onboard above ground surface energy harvesting electric current motoring device, comprising:
    an electro mechanical device attached to members having at least one of rotational and translational kinetic energy;
    a translator and stator core housing attached such that at least one of reciprocation and changing angular displacement and gravity induces movement of the translator within the stator core housing; and,
    movement of the translator within the stator core housing generates at least one of magnetic flux and a flow of energy and electric current and induced voltage.

2. The walking beam type pumping unit further including at least one of onboard above ground surface energy harvesting electric current generating device and onboard above ground surface energy harvesting electric current motoring device of claim 1, comprising:
    a translator whose motive force is gravity effect induced from changing angular displacement;
    a stator core housing attached to linkage causing reciprocation;
    the reciprocating translator whose motive force is changing angular displacement of stator caused by linkage motion that result in translator reciprocation induced from effect of gravity;
    the stator core housing whose attachment to linkage causes motion that result in changing angular displacement; and,
    the moving translator within the stator core housing generates at least one of magnetic flux and flow of energy and electric current and induced voltage.

3. The walking beam type pumping unit further including at least one of onboard above ground surface energy harvesting electric current generating device and onboard above ground surface energy harvesting electric current motoring device of claim 1, further comprised of:
    controller;
    capacitor; and,
    electric energy storage.

4. The walking beam type pumping unit further including at least one of onboard above ground surface energy harvesting electric current generating device and onboard above ground surface energy harvesting electric current motoring device of claim 1, wherein:
    at least one of winding and conductor is an element of a stator core housing; and,
    at least one of magnetic field and magnetic flux are an element of a moving translator.

5. The walking beam type pumping unit further including at least one of onboard above ground surface energy harvesting electric current generating device and onboard above ground surface energy harvesting electric current motoring device of claim 1, wherein:
    at least one of winding and conductor is an element of a translator; and,
    at least one of magnetic field and magnetic flux is an element a stator core housing.

6. The walking beam type pumping unit further including at least one of onboard above ground surface energy harvesting electric current generating device and onboard above ground surface energy harvesting electric current motoring device of claim 1, wherein:
    a translator is at least one of a permanent magnet and electrical excitement.

7. The walking beam type pumping unit further including at least one of onboard above ground surface energy harvesting electric current generating device and onboard above ground surface energy harvesting electric current motoring device of claim 1, wherein:
    a translator partial motive force is crank arm rotational kinetic energy;
    the translator partial motive force is walking beam translational kinetic energy; and,
    kinetic energy is harvested to linearly convert to at least one of electric current and induced voltage by the electric current generating devices.

8. The walking beam type pumping unit further including at least one of onboard above ground surface energy harvesting electric current generating device and onboard above ground surface energy harvesting electric current motoring device of claim 1, further including:
    at least one of motoring mode and generating mode providing power for the walking beam pumping unit;
    at least one of motoring mode and generating mode providing power for the walking beam pumping unit controls; and,
    at least one of motoring mode and generating mode providing power for the walking beam pumping unit auxiliary devices.

9. The walking beam type pumping unit further including at least one of onboard above ground surface energy harvesting electric current generating device and onboard above ground surface energy harvesting electric current motoring device of claim 1, wherein:
    a translator moves in relation to a stator attached to a walking beam when walking beam reciprocates; and,
    the translator moves within a circular stator attached to a crank arm urging circular motion when crank arm rotates.

10. The walking beam type pumping unit further including at least one of onboard above ground surface energy harvesting electric current generating device and onboard above ground surface energy harvesting electric current motoring device of claim 1, wherein:
    translational kinetic energy from reciprocating a walking beam pumping unit actuates device;
    translational kinetic energy from a well load of the walking beam pumping unit actuates device;
    rotational kinetic energy from crank arms of the walking beam pumping unit actuates device; and,
    walking beam pumping unit kinetic energy converted with electro mechanical device to at least one of electric current and induced voltage.

11. The walking beam type pumping unit further including at least one of onboard above ground surface energy harvesting electric current generating device and onboard above ground surface energy harvesting electric current motoring device of claim 1, wherein:
- at least one of translator and stator housing core generate at least one of magnetic field and electrostatic field from at least one of motion and kinetic energy.

12. The walking beam type pumping unit further including at least one of onboard above ground surface energy harvesting electric current generating device and onboard above ground surface energy harvesting electric current motoring device of claim 1, wherein;
- a reciprocating motion walking beam lever is at least one of class 1 and class 2 and class 3 lever.

13. A reciprocating piston, energy harvesting, electro mechanical device actuated by a walking beam that produces at least one of generated electric current and motor function, comprising:
- at least one of a stator housing core attached to a foundation of a reciprocating walking beam pumping unit and the stator housing core attached to the reciprocating walking beam of the walking beam pumping unit; and further comprising,
- at least one of a translator attached to the reciprocating walking beam of the walking beam pumping unit and the translator attached to a foundation of the reciprocating walking beam pumping unit;
- the translator moves within the stator core.

14. The reciprocating-piston energy-harvesting electromechanical device that at least one of generates electric current and motors actuated by a walking beam of claim 13, wherein:
- at least one of a stator housing core contiguously attached to a walking beam and a translator contiguously attached to the walking beam further includes at least one of winding and conductor;
- at least one of a moving translator and stator housing core contiguously attached to the walking beam further includes magnets;
- walking beam movement of a walking beam pumping unit generates at least one of a magnetic field and an electrostatic field in the electromechanical device;
- at least one of walking beam reciprocating motion mechanically moves the stator housing core in relation to the translator and walking beam reciprocating motion mechanically moves the translator in relation to the stator housing core;
- movement of stator housing core in relation to the translator generates at least one of a magnetic flux and a flow of energy as at least one of the electric current and induced voltage; and,
- translators move in relation to stators attached to linkage elements such that induced motion at least one of motors and generates.

15. The reciprocating-piston energy-harvesting electromechanical device that at least one of generates electric current and motors actuated by a walking beam of claim 13:
- supplements electric power for at least one of a prime mover and auxiliary devices and control devices for a walking beam pumping unit.

16. A swaying-to-and-fro energy harvesting electro mechanical electric current at least one of generating and motoring device pivotably coupled to a walking beam pumping unit, comprising:
- freestanding translator movement within a stator core partially facilitated by pivotably coupled moving member linkages of a reciprocating walking beam pumping unit;
- freestanding translators moving back and forth by gravity within the stator core from sway to and fro changing stator core angular displacement; and,
- freestanding translator movement within at least one of a winding and other conductor of the stator core housing generates at least one of magnetic flux and a flow of energy as at least one of electric current and induced voltage.

17. The swaying-to-and-fro energy harvesting electro mechanical electric current at least one of generating and motoring device pivotably coupled to a walking beam pumping unit of claim 16, whereas:
- freestanding translator movement generates an electric current within a stator core housing attached to an upper end of a lever effort extension member comprising an extended pitman arm; and,
- a stator core housing with the freestanding translator encased within is the electric current at least one of generating motoring device that actuates by re-positioning alternatively away from a walking beam lever fulcrum and toward a walking beam lever fulcrum during opposite rotating crank arm positions.

18. The swaying-to-and-fro energy harvesting electro mechanical electric current at least one of generating and motoring device pivotably coupled to a walking beam pumping unit of claim 16, wherein:
- a freestanding translator within a stator core housing device communicably couplable to a walking beam and configured to sway to and fro on extended pitman arms between in front of a walking beam effort to behind the walking beam effort so that swaying to and fro induces freestanding translator movement and generates electric current;
- the said freestanding translator within the stator housing core is the electric current at least one of generating and motoring device, said device connected to the extended pitman arm contiguous to a pitman arm, wherein the extended pitman arm extends above the effort; and,
- the freestanding translator reciprocates within the stator core housing electric current at least one of generating and motoring device swaying to and fro between near to a fulcrum and load and thus in front of the effort, to away from the fulcrum and load behind the effort thereby changing angular displacement to induce freestanding translator movement.

19. The swaying-to-and-fro energy harvesting electro mechanical electric current at least one of generating and motoring device pivotably coupled to a walking beam pumping unit of claim 16, comprising:
- the walking beam pumping unit with a freestanding translator moving from force of gravity within a stator housing core to generate an electric current while swaying to and fro from in front of to behind the effort; and,
- the freestanding translator moving within the stator housing core electric current at least one of generating and motoring device swaying to and fro in front of and behind the effort.

20. The swaying-to-and-fro energy harvesting electro mechanical electric current at least one of generating and motoring device pivotably coupled to a walking beam pumping unit of claim 16, wherein:
- a stator core housing comprised of one or more of moveable freestanding translators within; and,
- freestanding translators move in relation to stators attached to linkage elements such that induced motion causes at least one of motoring and generating.

21. The swaying-to-and-fro energy harvesting electro mechanical electric current at least one of generating and motoring device pivotably coupled to a walking beam pumping unit of claim 16, wherein:
- a moveable freestanding translator resides encased in a stator housing core whose angular displacement changes by swaying to and fro motion;
- at least one of changing angular displacement and a motive force of gravity induces reciprocating movement of the freestanding translator in the stator core housing swaying to and fro thereby generating at least one of the electric current and induced voltage;
- the force of gravity re-positions the freestanding translator to generate the electric current as the changing angular displacement of the stator core housing sways to and fro.

\* \* \* \* \*